(12) United States Patent
Miszkiewicz

(10) Patent No.: US 10,793,255 B2
(45) Date of Patent: Oct. 6, 2020

(54) SYSTEM AND METHOD FOR CONTROLLING PROPELLER PITCH

(71) Applicant: GENERAL ELECTRIC COMPANY, Schenectady, NY (US)

(72) Inventor: Krzysztof Miszkiewicz, Mazowieckie (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 938 days.

(21) Appl. No.: 15/228,148

(22) Filed: Aug. 4, 2016

(65) Prior Publication Data
US 2017/0066523 A1 Mar. 9, 2017

(30) Foreign Application Priority Data

Sep. 7, 2015 (PL) ...................................... P-413810

(51) Int. Cl.
*B64C 11/38* (2006.01)
*F02C 3/04* (2006.01)
(Continued)

(52) U.S. Cl.
CPC ............ *B64C 11/38* (2013.01); *B64C 11/306* (2013.01); *F02C 3/04* (2013.01); *F02C 7/06* (2013.01);
(Continued)

(58) Field of Classification Search
CPC ... B64C 11/38; B64C 11/306; F04D 29/0055; F04D 15/0055; F01D 7/00; F15B 15/1466; F15B 15/16; F15B 2015/1495
See application file for complete search history.

(56) References Cited

U.S. PATENT DOCUMENTS 2,357,228 A * 8/1944 Werner ................... F03B 3/145
416/157 R
2,794,508 A * 6/1957 Anders .................. B63H 3/082
416/157 R
(Continued)

FOREIGN PATENT DOCUMENTS

EP 0363997 A2 4/1990
EP 1881176 A2 1/2008
(Continued)

OTHER PUBLICATIONS

Poland Search Report issued in connection with Related PL Application No. 413811 dated Nov. 15, 2016.
(Continued)

*Primary Examiner* — Ninh H. Nguyen
*Assistant Examiner* — Aye S Htay
(74) *Attorney, Agent, or Firm* — Dority & Manning, P.A.

(57) ABSTRACT

Systems and methods are disclosed for controlling the pitch angle of a propeller and rotor assembly that selectively limit the pitch angle according to a selected mode of operation. The system includes an actuator having forward and aft chambers, an oil transfer bearing (OTB), and a fine stop collar. The fine stop collar including a first passage in fluid communication with the OTB and forward chamber during a ground-based mode of operation, and a second fluid passage being in fluid communication with the OTB and forward chamber during a flight-based mode of operation.

20 Claims, 5 Drawing Sheets

(51) Int. Cl.
*F02C 7/06* (2006.01)
*B64C 11/30* (2006.01)
*B64D 27/00* (2006.01)

(52) U.S. Cl.
CPC .. *B64D 2027/005* (2013.01); *F05D 2220/323* (2013.01); *F05D 2240/35* (2013.01); *Y02T 50/66* (2013.01)

(56) References Cited

U.S. PATENT DOCUMENTS

| | | | |
|---|---|---|---|
| 4,523,891 A | | 6/1985 | Schwartz et al. |
| 4,863,347 A | * | 9/1989 | Trott ................ B64C 11/38 416/46 |
| 4,893,989 A | | 1/1990 | Carvalho |
| 5,174,718 A | * | 12/1992 | Lampeter ........... B64C 11/38 416/157 R |
| 5,186,608 A | * | 2/1993 | Bagge ............... B64C 11/38 416/147 |
| 5,897,293 A | * | 4/1999 | Arel ................ B64C 11/303 416/114 |
| 6,811,376 B2 | * | 11/2004 | Arel ................ B64C 11/38 416/155 |
| 8,336,290 B2 | | 12/2012 | Glynn et al. |
| 8,371,105 B2 | * | 2/2013 | Glynn ............... F01D 7/00 60/268 |
| 2010/0104438 A1 | * | 4/2010 | Charier ............. F01D 7/00 416/128 |
| 2010/0310371 A1 | | 12/2010 | Eglin |
| 2011/0208400 A1 | | 8/2011 | Lickfold et al. |
| 2012/0070292 A1 | * | 3/2012 | Balk ................ B64C 11/306 416/168 A |
| 2012/0079809 A1 | * | 4/2012 | Glynn ............... B64C 11/38 60/268 |
| 2014/0017086 A1 | * | 1/2014 | Charier ............. B64C 11/308 416/128 |
| 2014/0193261 A1 | | 7/2014 | Frantz et al. |
| 2016/0244149 A1 | * | 8/2016 | Carrington ......... B64C 11/301 |
| 2017/0066523 A1 | | 3/2017 | Miszkiewicz |

FOREIGN PATENT DOCUMENTS

| | | |
|---|---|---|
| EP | 3138771 A1 | 3/2017 |
| GB | 2461784 A | 1/2010 |
| JP | 2017095081 A | 6/2017 |
| KR | 20120014347 A | 2/2012 |
| WO | 2015052459 A1 | 4/2015 |
| WO | WO 2015-052459 * | 4/2015 |

OTHER PUBLICATIONS

Poland Search Report issued in connection with Corresponding PL Application No. 413810 dated Nov. 15, 2016.
European Search Report & Opinion issued in connection with corresponding EP Application No. 16186944.1 dated Jan. 30, 2017.
GE Related Case Form.
Canadian Office Action Corresponding to CA Application 2940042 dated Jun. 22, 2017.
Chinese Office Action Corresponding to CN Application 2016108072562 dated Aug. 2, 2017.

* cited by examiner

SYSTEM AND METHOD FOR CONTROLLING PROPELLER PITCH

FIELD OF THE INVENTION

The present subject matter relates generally to variable pitch control systems and methods for gas turbine engine propellers, and more particularly to systems and methods for limiting propeller pitch.

BACKGROUND OF THE INVENTION

Gas turbine engines generally include a core engine powering a turbine to rotate one or more fan or propeller blade. One type of gas turbine engine, known as an "open rotor" design, operates similarly to a conventional turbofan and turboprop designs, but with fuel efficiency that is superior to both. A turbofan engine operates on the principle that a central gas turbine core drives a bypass fan, the fan being located at a radial location between a nacelle of the engine and the engine core. However, in an open rotor design, a "bypass" propeller is mounted outside of an engine's nacelle. This permits the propeller to act on larger volumes of air and generate more thrust than with conventional turbofan engine. In some open rotor engines, the "bypass" propeller includes two counter-rotating rotor assemblies, each rotor assembly carrying an array of propeller blades located outside the engine nacelle.

A pitch control system may be attached to the propellers in order to alter the propellers' pitch angle according to desired flight characteristics. Optimum performance requires such systems to have a high-degree of accuracy. However, the desired pitch range may differ according to the ambient conditions or operation state. An ideal propeller pitch for one condition may lead to catastrophic failure in another.

Accordingly, improved pitch control systems and methods are desired. In particular, pitch control systems and methods for gas turbine engines that selectively limit the pitch angle would be advantageous.

BRIEF DESCRIPTION OF THE INVENTION

Aspects and advantages of the invention will be set forth in part in the following description, or may be obvious from the description, or may be learned through practice of the invention.

A propeller pitch control system and method is generally provided that limits a propeller pitch angle during selected modes of operation.

In accordance with one embodiment, the pitch control system includes a linear actuator engaged with a propeller blade crankshaft to vary propeller blade pitch. The actuator includes a cylinder having a fluidly-sealed cylinder wall, as well as a piston translatably attached to the propeller blade crankshaft. The piston includes a flange disposed within the cylinder to define a forward chamber and an aft chamber of the cylinder, a projection extending from the flange through the cylinder aft chamber, and a coarse rotatable pipe attached to the piston and disposed through the cylinder forward chamber. Also included is an oil transfer bearing (OTB) positioned along a central axis and joined to the cylinder wall in fluid communication with the forward chamber. Further included is a fine stop collar annularly positioned about the OTB and defining discrete first and second fluid passages. The first fluid passage is in fluid communication with the OTB and forward chamber during a ground-based mode of operation, the second fluid passage is in fluid communication with the OTB and forward chamber during a flight-based mode of operation.

In accordance with another embodiment, a gas turbine engine is included. The gas turbine engine includes a core engine extending along a central axis, at least one row of propeller blades mounted on a rotatable frame circumferentially about the central axis, including at least one propeller blade and crankshaft pivotable about a radial blade axis, and a linear actuator positioned parallel to the central axis. The linear actuator includes a cylinder having a fluidly-sealed cylinder wall, a piston translatably attached to a propeller blade crankshaft, and a coarse rotatable pipe attached to the piston. The piston includes a flange disposed within the cylinder to define a forward chamber and an aft chamber of the cylinder, a projection extending from the flange through the cylinder aft chamber, and a coarse rotatable pipe disposed through the cylinder forward chamber. Also included is an oil transfer bearing (OTB) positioned along a central axis and joined to the cylinder wall in fluid communication with the forward chamber. Further included is a fine stop collar annularly positioned about the OTB and defining discrete first and second fluid passages. The first fluid passage is in fluid communication with the OTB and forward chamber during a ground-based mode of operation, the second fluid passage is in fluid communication with the OTB and forward chamber during a flight-based mode of operation.

In accordance with another embodiment, a method for controlling a pitch angle of a row of propeller blades is included. The propeller blades being mounted on a rotatable frame circumferentially about a central axis, including at least one propeller blade and crankshaft pivotable about a radial blade axis. The method includes the step of initiating a ground-based mode of operation or a flight-based operation for an actuator including a piston having a flange disposed within a cylinder to define a forward chamber and an aft chamber, the piston being attached to a coarse rotatable pipe disposed through the cylinder, the forward chamber of the cylinder being in fluid communication with an oil transfer bearing (OTB) parallel to the coarse rotatable pipe. Also included are the steps of selecting a pitch-change function and conditionally responding according to the initiating step. On the condition that a ground-based mode of operation is initiated, the responding step includes separately transporting hydraulic fluid through the coarse rotatable pipe and through a first fluid passage of a fine stop collar while restricting transportation of hydraulic fluid into a discrete second fluid passage of the fine stop collar, the fine stop collar being disposed on the OTB. On the condition that a flight-based mode of operation is initiated, the responding step includes separately transporting hydraulic fluid through the coarse rotatable pipe and through the second fluid passage while restricting transportation of hydraulic fluid from the first fluid passage. Further included is the step of translating the OTB, the coarse rotatable pipe, and the piston in concert parallel to the central axis while transferring hydraulic fluid between the cylinder aft chamber and the coarse rotatable pipe; and converting translation movement at the piston into a pivotal movement of the crankshaft about the radial blade axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
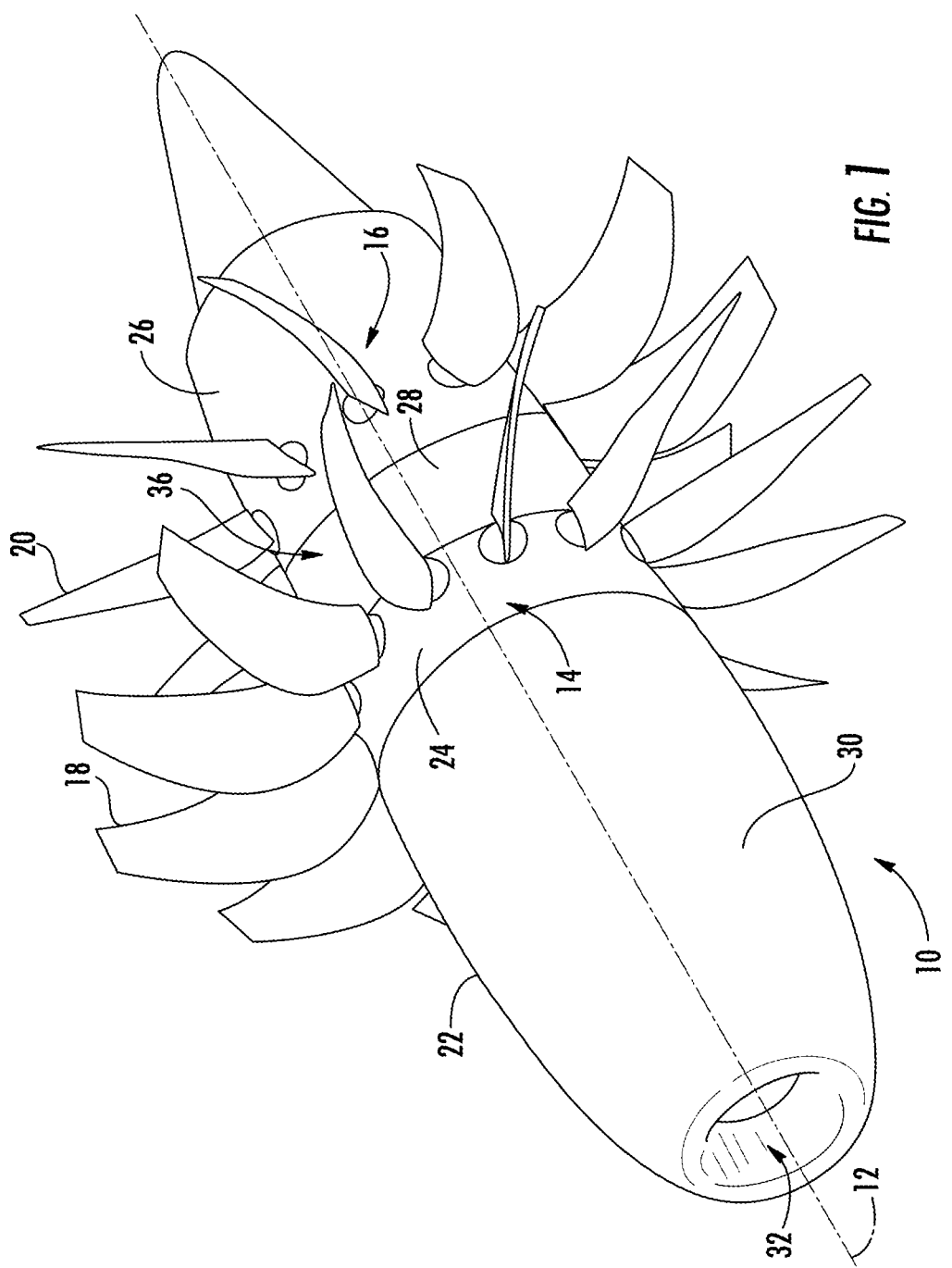
FIG. 1 is a perspective view of an open rotor counter rotational engine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. The specific embodiments discussed herein are merely illustrative of specific ways to make and use the invention and do not delimit the scope of the invention.

In order to aid understanding of this disclosure, several terms are defined below. The defined terms are understood to have meanings commonly recognized by persons of ordinary skill in the arts relevant to the present invention.

The terms "includes" and "including" are intended to be inclusive in a manner similar to the term "comprising." Similarly, the term "or" is generally intended to be inclusive (i.e., "A or B" is intended to mean "A or B or both"). The phrase "in one embodiment," does not necessarily refer to the same embodiment, although it may.

The terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The terms "radial" or "radially" refer to a dimension extending between a center longitudinal axis of the engine and an outer engine circumference. The term "forward" used in conjunction with "axial" or "axially" refers to a direction toward the engine inlet, or a component being relatively closer to the engine inlet as compared to another component. The terms "rear" or "aft" used in conjunction with "axial" or "axially" refers to a direction toward the engine nozzle, or a component being relatively closer to the engine nozzle as compared to another component. Unless stated otherwise, the positional terms "above"/"below," "upward"/"downward," "outer"/"inner," and "outward"/"inward" refer to radial positioning and direction relative to the central axis.

The terms "controller," "control circuit," and "control circuitry" as used herein may refer to, be embodied by, or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Referring now to the figures, FIG. 1 illustrates an exemplary open rotor gas turbine engine 10 defining a central axis 12. Positioned about the central axis 12 are multiple axially spaced apart counter-rotatable forward and aft annular rotor assemblies 14, 16. The assemblies 14, 16 include forward and aft propeller blades 18, 20 respectively that are disposed radially outwardly of an outer shroud or nacelle 22. The forward and aft annular rotor assemblies 14, 16 are illustrated herein as having twelve forward propellers 18 and ten aft propellers 20 but other numbers of propellers may be used. The nacelle 22 includes a forward fairing 24 which is coupled to and rotatable with the forward propellers 18 and an aft fairing 26 coupled to and rotatable with the aft propeller 20. The nacelle 22 further includes a spacer fairing 28 disposed between the forward and aft fairings 24, 26 and a nacelle nose 30 disposed radially outwardly of and surrounding a core engine 32. The nacelle nose 30 includes a nose inlet 34 that directs ambient air to the core engine 32. The nacelle 22 provides the proper airflow characteristics to optimize the performance of the propellers 18, 20.

Figure 2:
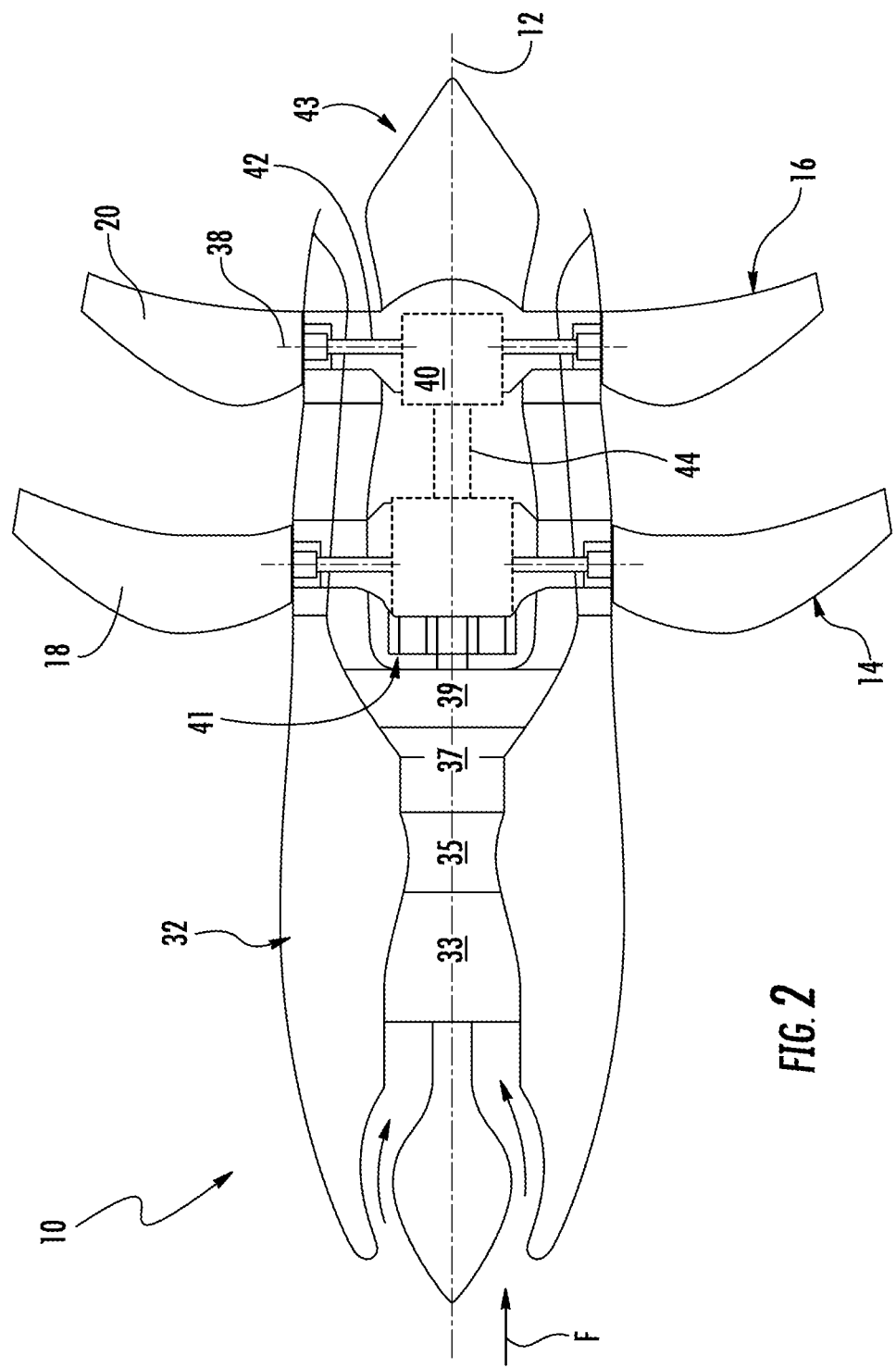
FIG. 2 is a schematic axial section view of an open rotor counter rotational engine embodiment.

The open rotor aircraft gas turbine engine 10 illustrated in FIGS. 1-2 is a pusher type engine having the spaced apart counter-rotatable forward and aft annular rotor assemblies 14, 16 of forward and aft propeller blades 18, 20 located generally at an aft end 36 of the engine and aft of the core engine 32 and the nacelle nose 30. The forward and aft annular rotor assemblies 14, 16 of the forward and aft propellers 18, 20 are a counter-rotating pusher type. Generally, the rotor assemblies 14, 16 are used to transfer thrust forces produced by the forward and aft propeller blades 18, 20 to an aircraft (not shown) and hence the designation pusher. Although a pusher system is described for illustrative purposes, it is envisioned that the claimed system would be equally applicable to puller systems—wherein propeller blades are positioned on a generally forward turbine frame to effectively "pull" an aircraft forward, as is known to those of ordinary skill in the art.

As illustrated in FIG. 2, the core engine 32 forms part of a gas turbine engine with one or more compressor 33, a combustor 35, and high and low pressure turbines 37, 39 in a downstream axial flow relationship F. The low and high pressure turbines 37, 39 are operably joined to the compressor 33 such that rotation of the turbines 37, 39 drives the compressor 33. In addition, the turbines 37, 39 are also operably joined to an epicyclical gearbox 41 which rotates the counter-rotating rotor assemblies 14, 16.

During operation, the flow of a compressible fluid (e.g., gas) stream F begins at the nacelle nose inlet 34. From there, the gas stream travels through the one or more compressors 33 before being ignited with a fuel at the annular combustor 35. The combustion rotates the high-pressure turbine 37 and the low-pressure turbine 39 before being expelled at the exhaust 43. Rotation of the turbines 37, 39 drives the compressors 33 and the gearbox 41, which then rotates the counter-rotating rotor assemblies 14, 16.

The propeller blades 18, 20 of the forward and aft propellers are of the variable setting angle type, i.e. they can be oriented about their respective radial pivot axes 38 by a pitch control system 40, so that the blades assume an optimal angular position according to the operating conditions of the engine and the relevant flight phases. The pitch control system 40 is attached to an inner frame 44 that remains static during rotation of the propeller blades 18, 20 and pitch adjustments thereto. In some embodiments, a blade support column 42 extends below the blades 18, 20 along the radial axis 38 and couples the blades 18, 20 to the pitch control system 40.

In the present description, only the system 40 for orienting blades associated with the aft rotor assembly 16 will be described. The forward rotor assembly 14, which is not shown in FIGS. 3-5, can be provided with a system for orienting blades that is similar or different to that described hereafter with reference to the aft rotor assembly 16.

Figure 3:
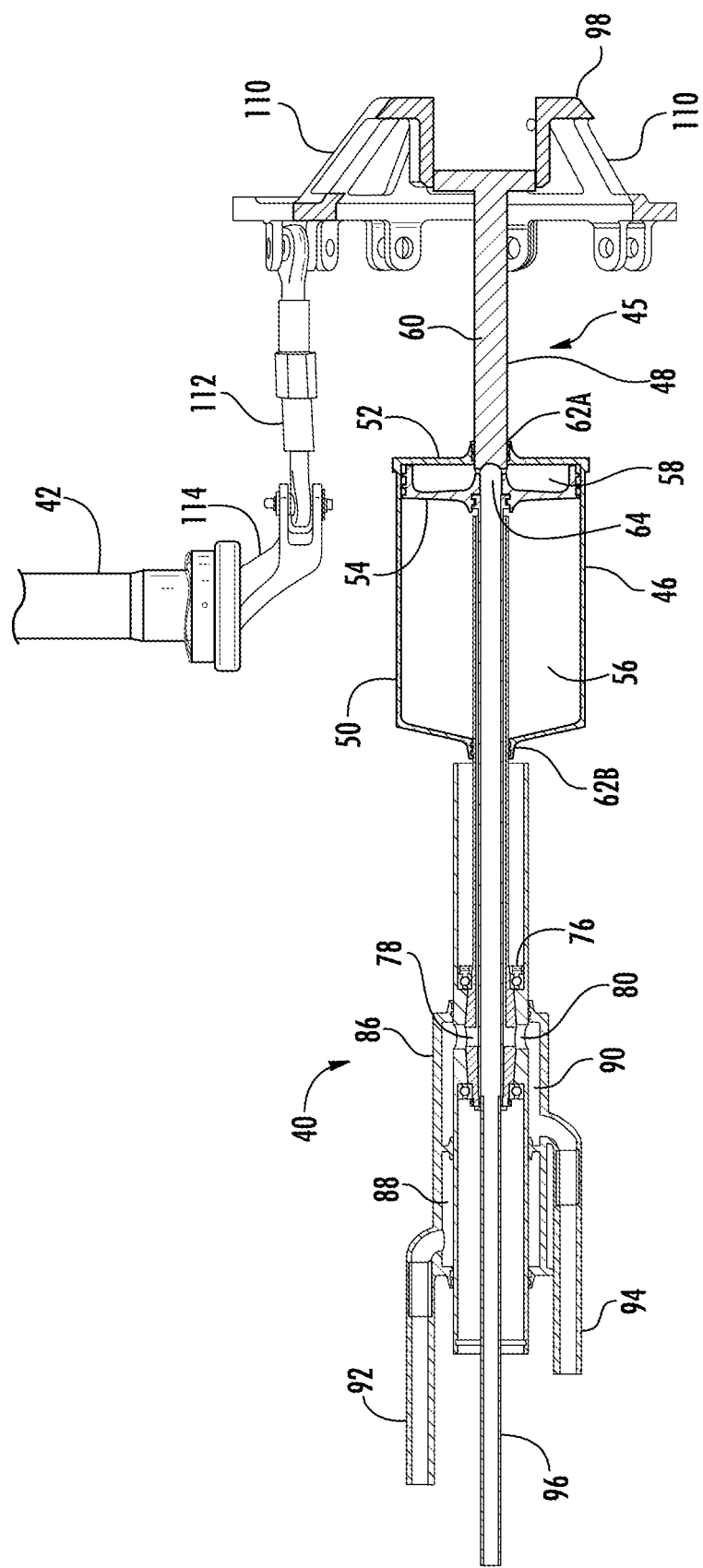
FIG. 3 is an axial view of an aft rotor pitch control system embodiment.
Figure 4:
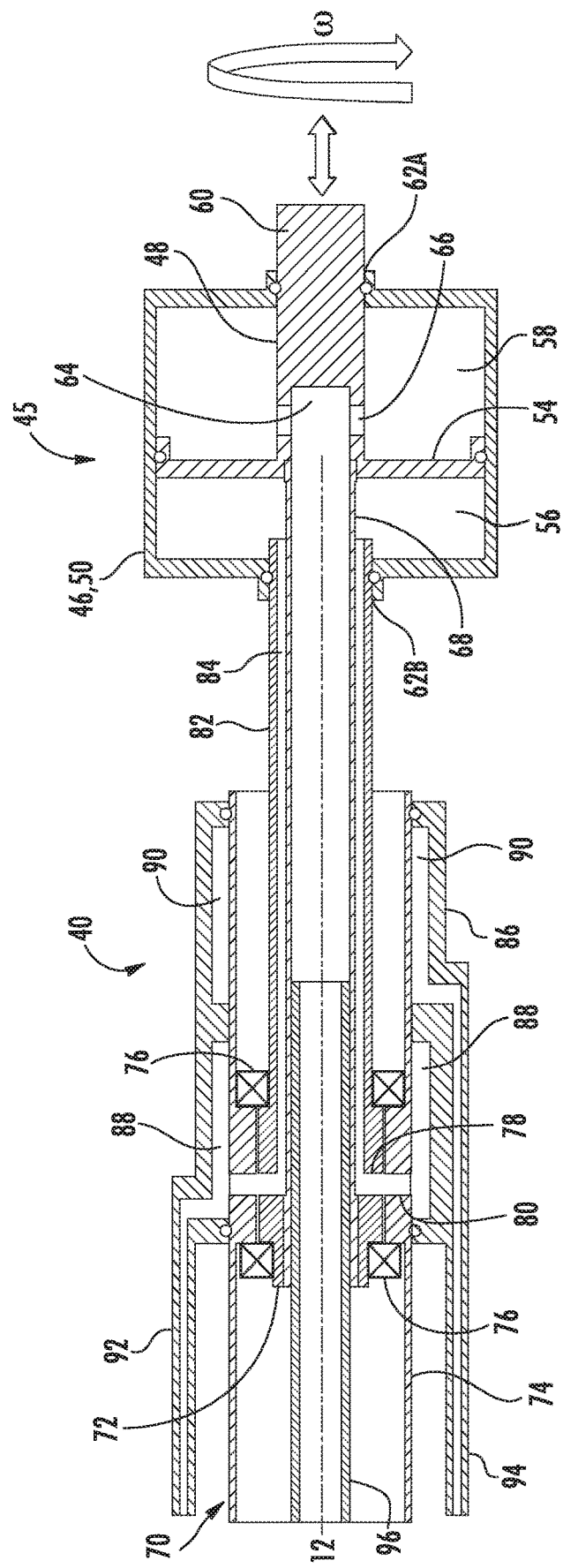
FIG. 4 is embodiment schematic axial view of the pitch control system embodiment of FIG. 3.
Figure 5:
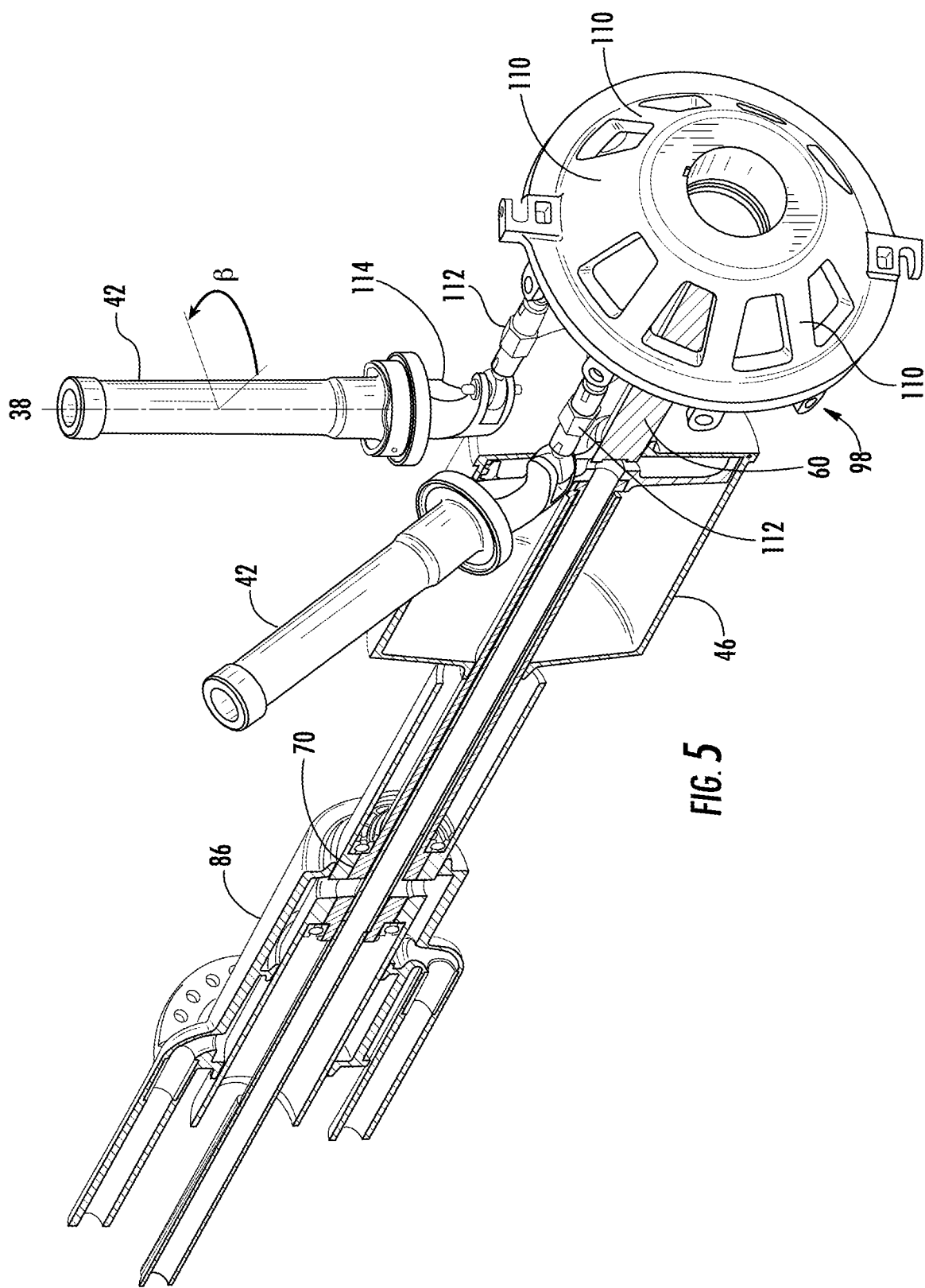
FIG. 5 is a perspective cut-away view of the embodiment of FIG. 3.

Turning to FIG. 3-5, the pitch control system 40 comprises a linear actuator 45 that translates along the central axis 12. Hydraulic fluid is supplied from a fluid reservoir (not shown) according to a selected operation mode in order to propel portions of the actuator to a desired location relative to the static inner frame 44.

Generally, the actuator 45 includes a cylinder 46 which at least partially encloses a piston 48. During operation, the cylinder 46 remains axially static (i.e., stationary relative to the inner frame 44) while the piston 48 is able to translate along the central axis 12. A cylinder wall 50 fluidly seals the area around the piston 48. In optional embodiments, the wall 50 is formed as an integral unit or, alternatively, comprises separable elements, including a sealed fluid cap 52 permitting selective access inside the cylinder 46. Within the cylinder, a piston flange 54 extends radially outward to define two fluidly discrete chambers 56, 58 with the cylinder wall 50. When assembled, the flange 54 of certain embodiments engages the cylinder wall 50 and forms a slidable fluid seal between the forward chamber 56 and the aft chamber 58.

As shown, some embodiments of the piston 48 include a projection 60 extending axially from the flange 54 and through aft chamber 58. A first opening 62A in the wall 50 permits the projection 60 to protrude through an aft end the cylinder wall 50 while maintaining a fluid seal about the projection 60. A piston cavity 64 is optionally defined along the central axis 12 in an area beneath the flange 54 and aft chamber 58. The projection 60 may define one or more radial orifice 66 above the cavity 64. The orifice 66 extends radially outward from the cavity 64 and to the aft chamber 58. As a result, during operation, the orifice 66 is able to permit fluid to pass between the aft chamber 58 and piston cavity 64.

A coarse rotatable pipe 68 is joined to the piston 48 in fluid communication with the piston cavity 64. In certain embodiments, the coarse rotatable pipe 68 extends through the forward cylinder chamber 56 and cylinder wall 50. During pitch change operations, the coarse rotatable pipe 68 is translated in tandem with the piston 48. During rotation of the blades 20, the rotatable pipe 68 and piston 48 are rotated about the central axis 12 and in relation to the static cylinder wall 50. Although the coarse rotatable pipe 68 directs fluid to/from the cylinder's aft chamber 58, the rotatable pipe 68 is fluidly isolated (i.e., sealed off from) fluid communicated to the forward chamber 56. In some embodiments, a second opening 62B within the cylinder wall 50 permits the coarse rotatable pipe 68 to pass through the wall 50 in fluid communication with the fluid reservoir.

As shown, an oil transfer bearing (OTB) 70 is also positioned along the central axis 12. At least a portion of the OTB 70 extends above, and is positioned annularly about, a portion of the coarse rotatable pipe 68. The OTB 70 includes a rotatable rotor 72 and rotationally-static stator 74. The OTB rotor 72 and stator 74 are concentrically joined and translationally fixed. Although, the rotor 72 freely rotates within (and relative to) the stator 74, they translate simultaneously. Therefore, translation of one of the rotor 72 or stator 74 translates the other during pitch change operations. In optional embodiments, one or more bearing rings 76 are positioned radially between the rotor 72 and the stator 74 to maintain a set radial distance between them. One or more ball bearings, needle bearings, or other low-friction structure, may be included within the bearing rings to facilitate rotation.

As well as being attached to the OTB stator 74, the OTB rotor 72 is joined to the coarse rotatable pipe 68 in fixed parallel engagement. Rotation of the rotatable pipe 68 is transferred to the rotor 72. Similarly, translation of the coarse rotatable pipe 68 translates the rotor 72. Since the rotor 72 is attached to the stator 74, translation of the pipe 68 also translates the stator 74.

The OTB rotor 72 and stator 74 each define one or more radial hole 78, 80. When assembled, the system's rotor holes 78 and stator holes 80 are axially-aligned. Moreover, although the rotor 72 is able to rotate about the stator 74, the rotor holes 78 and stator holes 80 are brought into cyclical radial alignment. As a result, during operation, rotation of the rotor 72 creates a repeated cycle whereby the holes 78, 80 are both axially and radially aligned. When this occurs, fluid is permitted to pass from one hole 78/80 into the other 80/78.

Some embodiments of the rotor 72 further include a partition 82 rotatably attached to the cylinder wall 50. In certain embodiments, the partition extends through the second wall opening 62B, while the surrounding portion of the wall 50 creates a fluid seal about the partition 82. Together with coarse rotatable pipe 68, the partition 82 defines a partition channel 84 extending from the rotor hole 78 to the cylinder forward chamber 56. Hydraulic fluid is permitted to travel from the rotor hole 78 and through the partition channel 84 into the forward chamber 56.

Disposed above the OTB 70 is a fine stop collar 86. The fine stop collar 86 is translationally static relative to the frame 44 and engages the OTB 70 in a fluid seal therebetween. As a result, translation to the OTB 70 is not transferred to the collar 86. Structurally, the collar 86 defines two discrete fluid passages 88, 90 axially separated from each other in parallel alignment. Specifically, each passage 88, 90 is parallel to the central axis 12. The passages 88, 90 are annularly positioned about at least a portion of the OTB 70. As the OTB 70 translates below the collar 86, the radial holes 78, 80 are brought into axial alignment with the passages 88, 90. Each passage 88, 90 includes a distinct and separate axial range in which that passage fluidly communicates with the radial holes 78, 80. During a ground based mode of operation, the OTB radial holes 78, 80 are within the axial range of (i.e., in fluid communication with) the first fluid passage 88. During a flight based mode of operation, the radial holes 78, 80 are within the axial range of (i.e., in fluid communication with) the second fluid passage 90.

One or more fluid inlet pipes are able to direct hydraulic fluid to and from the passages 88, 90. In some embodiments, a ground fine inlet pipe 92 directs fluid to the first fluid passage 88, while a discrete flight fine inlet pipe 94 directs fluid to the second fluid passage 90. Moreover, in certain embodiments a coarse inlet pipe 96 directs fluid into the coarse rotatable 68 pipe. In optional embodiments, the coarse inlet pipe 96 is fixed relative to the static frame 44. In some such embodiments, the coarse inlet pipe 96 extends coaxially into the coarse rotatable pipe 68 and permits rotation of the rotatable pipe 68 about the coarse inlet pipe 96.

As shown in FIGS. 3 and 5, some embodiments of the system 40 include a cross head 98 attached to the piston 48. Optionally, the cross head 98 is be attached to the projection 60 to move therewith. The attachment may be formed by an integral connection (e.g., a welded bead or a monolithically conjoined body) or may be a selective connection permitting operable detachment and reattachment (e.g., threaded joint, bolt and nut, or another mechanical connection joint). When attached, translation of the projection 60 during pitch change operations similarly translates the cross head 98.

When attached to the projection 60, one or more fingers 110 extend radially outward from the projection 60 (i.e., to a position radially above the projection) and attach to one or more crank rods 112. Each crank rod 112 is pivotally attached to a propeller blade crankshaft 114. The crankshaft 114 is rotationally fixed relative to the support column 42. As a result, translation of crank rods 112 forces the crankshaft 114 to rotate the column 42 about the blade axis 38. Rotation of the crankshaft 114 about the blade axis 38 thereby changes blade pitch ($\beta$). During engine operation, rotation ($\omega$) of the blades 20 also occurs about the central axis 12. This rotation ($\omega$) of the propeller blades 20 about the central axis 12 simultaneously rotates the linked crank rods 112, cross head 98, and piston 48.

During a ground-based mode of operation, hydraulic fluid may be supplied by the ground fine inlet pipe 92 and through the first fluid passage 88. The radial holes 78, 80 direct the fluid into the OTB 70 and through the partition channel 84 to the first chamber 56. Simultaneously, fluid in the second chamber 58 is forced through the piston orifice 66 and into the coarse rotatable pipe 68 by way of the piston cavity 64. After entering the coarse rotatable pipe 68, hydraulic fluid is able to pass into the coarse inlet pipe 96 before returning to the fluid supply.

During a flight-based mode of operation, hydraulic fluid may be supplied by the flight fine inlet pipe 94 and through the second fluid passage 90. The radial holes 78, 80 direct the fluid into the OTB 70 and through the partition channel 84 to the first chamber 56. Simultaneously, fluid in the second chamber 58 is forced through the piston orifice 66 and into the coarse rotatable pipe 68 by way of the piston cavity 64. After entering the coarse rotatable pipe 68, hydraulic fluid is able to pass into the coarse inlet pipe 96 before returning to the fluid supply.

Hydraulic pressure may operably limit the translation of the system 40. As a result, flow to or from the passages 88, 90 is selectively restricted in order to limit translation within the system 40 and subsequent changes to propeller pitch ($\beta$).

For the purposes of illustration, an exemplary method of operation for a pitch control system 40 embodiment is described below. Upon providing the above described system 40, a ground-based or flight-based mode of operation is selectively initiated at a system controller (not shown) and a desired pitch angle is determined. The pitch angle determination may include calculating a required pitch change and necessary piston translation position based on a first measured pitch position and/or first measured piston position.

According to which mode of operation is initiated, a pitch-change function is selected to direct hydraulic fluid through the system 40. The system 40 conditionally responds to direct hydraulic fluid therethrough.

On the condition that a ground-based mode of operation is initiated, hydraulic fluid is transported through the ground fine inlet 92 and the coarse inlet pipe 96. If the necessary piston translation position is axially forward of the measured position, hydraulic fluid is transported through the ground fine inlet 92 to the first fluid passage 88 while fluid is simultaneously transported from the aft cylinder chamber 58 to the coarse rotatable pipe 68. If the necessary piston translation is axially rearward of the measured position, hydraulic fluid is transported from the forward cylinder chamber 56 to the partition channel 84 while fluid is simultaneously transported from the coarse inlet pipe 96 to the coarse rotatable pipe 68 and cylinder aft chamber 56. During the ground-based mode of operation, transportation of hydraulic fluid to the second fluid passage 90 is restricted and movement of the OTB radial holes 78, 80 within the second fluid passage range of translation is prevented. A predetermined ground mode pressure is maintained in the second fluid passage 90.

On the condition that a flight-based mode of operation is initiated, hydraulic fluid is transported through the flight fine inlet pipe 94 and the coarse inlet pipe 96. If the necessary piston translation position is axially forward of the measured position, hydraulic fluid is transported through the flight fine inlet pipe 94 to the second fluid passage 90 while fluid is simultaneously transported from the aft cylinder chamber 58 to the coarse rotatable pipe 68. If the necessary piston translation is axially rearward of the measured position, hydraulic fluid is transported from the forward cylinder chamber 56 to the partition channel 84 while fluid is simultaneously transported from the coarse inlet pipe 96 to the coarse rotatable pipe 68 and cylinder aft chamber 58. During the flight-based mode of operation, transportation of hydraulic fluid from the first fluid passage 88 is restricted and movement of the OTB radial holes 78, 80 within the first fluid passage range of translation is prevented. A predetermined flight mode pressure is maintained in the first fluid passage 88.

While fluid is transferred between the cylinder aft chamber 58 and the coarse rotatable pipe 68, the OTB 70, coarse rotatable pipe 68, and piston 48 are translated simultaneously in concert to meet the necessary piston translation position.

Translational movement at the piston 48 is transported to the crank rods 112 where it is converted kinematically into pivotal movement of the crankshafts 114 about the respective radial blades axes 38.

In some embodiments, the method further includes the step of rotating a row of propellers 18, 20 about the central axis 12. Also included is the step of rotating the OTB rotor 72, the coarse rotatable pipe 68, and the piston 48 about the central axis 12 in concert with the rotation of the propellers 18, 20 while the fine stop collar 86 and OTB stator 74 are maintained in a rotationally fixed position relative to the central axis 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch control system, comprising:
a linear actuator engaged with a propeller blade crankshaft to vary propeller blade pitch, the actuator including:
 a cylinder including a fluidly-sealed cylinder wall,
 a piston translatably attached to the propeller blade crankshaft, the piston including a flange disposed within the cylinder to define a forward chamber and an aft chamber thereof, a projection extending from the flange through the cylinder aft chamber, and a coarse rotatable pipe attached to the piston and disposed through the cylinder forward chamber;
an oil transfer bearing (OTB) positioned along a central axis, the OTB being joined to the cylinder wall in fluid communication with the forward chamber; and
a fine stop collar annularly positioned above the OTB, the fine stop collar defining discrete first and second fluid passages, the first fluid passage being in fluid communication with the OTB and forward chamber during a ground-based mode of operation, the second fluid passage being in fluid communication with the OTB and forward chamber during a flight-based mode of operation.

2. The pitch control system of claim 1, wherein the OTB comprises a rotatable rotor and a rotationally-fixed stator positioned about the OTB rotor, the OTB rotor being joined to the cylinder wall in parallel with the coarse rotatable pipe.

3. The pitch control system of claim 2, wherein the OTB rotor defines at least one radial rotor hole and the OTB stator defines at least one radial stator hole fluidly communicable with the at least one radial rotor hole.

4. The pitch control system of claim 3, wherein the OTB further comprises at least one bearing ring radially positioned between the OTB rotor and the OTB stator; and wherein the OTB stator is translationally fixed with respect to the OTB rotor.

5. The pitch control system of claim 1, further comprising:
a cross head attached to the piston projection and including at least one finger extending radially outward therefrom; and
a crank rod extending longitudinally from the cross head finger, wherein the propeller blade crankshaft is pivotally joined to the crank rod to direct rotation of the propeller blade about a radial blade axis.

6. The pitch control system of claim 1, wherein the fine stop collar first fluid passage is positioned parallel to the second fluid passage and axially separate therefrom; and wherein the OTB is translatably disposed through the fine stop collar and alternately communicable with the first fluid passage and the second fluid passage.

7. The pitch control system of claim 3, wherein the at least one radial rotor hole and at least one radial stator hole have an axial range of translation between the first fluid passage and the second fluid passage, further wherein the ground-based mode of operation restricts fluid communication into the second fluid passage, and wherein the flight based mode of operation restricts fluid communication from the first fluid passage.

8. The pitch control system of claim 1, further comprising:
a coarse inlet pipe coaxially attached to the coarse rotatable pipe in fluid communication therewith;
a ground fine inlet pipe attached to the fine stop collar in fluid communication with the first fluid passage; and
a flight fine inlet pipe attached to the fine stop collar in fluid communication with the second fluid passage.

9. The pitch control system of claim 8, wherein the projection of the piston defines at least one orifice through which the coarse rotatable pipe and the aft chamber are in fluid communication.

10. A gas turbine engine, comprising:
a core engine extending along a central axis;
at least one row of propeller blades mounted circumferentially about the central axis, including at least one propeller blade and crankshaft pivotable about a radial blade axis;
a linear actuator positioned parallel to the central axis and including:
 a cylinder including a fluidly-sealed cylinder wall,
 a piston translatably attached to the propeller blade crankshaft, the piston including a flange disposed within the cylinder to define a forward chamber and an aft chamber thereof, a projection extending from the flange through the cylinder aft chamber, and a coarse rotatable pipe attached to the piston and disposed through the forward chamber;
an oil transfer bearing (OTB) positioned along the central axis, the OTB being joined to the cylinder wall in fluid communication with the forward chamber; and
a fine stop collar annularly positioned above the OTB, the fine stop collar defining discrete first and second fluid passages, the first fluid passage being in fluid communication with the OTB and forward chamber during a ground-based mode of operation, the second fluid passage being in fluid communication with the OTB and forward chamber during a flight-based mode of operation.

11. The gas turbine engine of claim 10, wherein the OTB comprises a rotatable rotor and a rotationally-fixed stator positioned about the OTB rotor, the OTB rotor being joined to the cylinder wall in parallel with the coarse rotatable pipe.

12. The gas turbine engine of claim 11, wherein the OTB rotor defines at least one radial rotor hole and the OTB stator defines at least one radial stator hole fluidly communicable with the at least one radial rotor hole.

13. The gas turbine engine of claim 12, wherein the OTB further comprises at least one bearing ring radially positioned between the OTB rotor and the OTB stator; and wherein the OTB stator is translationally fixed with respect to the OTB rotor.

14. The gas turbine engine of claim 10, further comprising:
a cross head attached to the piston projection and including at least one finger extending radially outward therefrom; and
a crank rod extending longitudinally from the cross head finger, wherein the propeller blade crankshaft is pivotally joined to the crank rod to direct rotation of the propeller blade about the radial blade axis.

15. The gas turbine engine of claim 10, wherein the fine stop collar first fluid passage is positioned parallel to the second fluid passage and axially separate therefrom, and wherein the OTB is translatably disposed through the fine stop collar and alternately communicable with the first fluid passage and the second fluid passage.

16. The gas turbine engine of claim 12, wherein the at least one radial rotor hole and at least one radial stator hole have an axial range of translation between the first fluid passage and the second fluid passage, further wherein the ground-based mode of operation restricts fluid communication into the second fluid passage, and also wherein the flight based mode of operation restricts fluid communication from the first fluid passage.

17. The gas turbine engine of claim 10, further comprising:
   a coarse inlet pipe coaxially attached to the coarse rotatable pipe in fluid communication therewith;
   a ground fine inlet pipe attached to the fine stop collar in fluid communication with the first fluid passage; and
   a flight fine inlet pipe attached to the fine stop collar in fluid communication with the second fluid passage.

18. The gas turbine engine of claim 17, wherein the projection of the piston defines at least one orifice through which the coarse rotatable pipe and the aft chamber are in fluid communication.

19. The gas turbine engine of claim 10, wherein the core engine further comprises:
   a compressor mounted about a static frame,
   a combustor positioned downstream of the compressor to receive a compressed fluid therefrom, and
   a turbine positioned downstream of the combustor and operably joined to the row of propeller blades such that a rotation of the turbine is transferred to the row of propeller blades.

20. A method for controlling a pitch angle of a row of propeller blades mounted circumferentially about a central axis, including at least one propeller blade and crankshaft pivotable about a radial blade axis, the method comprising the steps of:
   initiating a ground-based mode of operation or a flight-based operation for an actuator including a piston having a flange disposed within a cylinder to define a forward chamber and an aft chamber, the piston being attached to a coarse rotatable pipe disposed through the forward chamber of the cylinder and attached to a projection extending from the flange through the cylinder aft chamber, the forward chamber of the cylinder being in fluid communication with an oil transfer bearing (OTB) parallel to the coarse rotatable pipe;
   selecting a pitch-change function;
   conditionally responding to the selecting step according to the initiating step, including
      on the condition that a ground-based mode of operation is initiated, separately transporting hydraulic fluid through the coarse rotatable pipe and through a first fluid passage of a fine stop collar while restricting transportation of hydraulic fluid into a discrete second fluid passage of the fine stop collar, the fine stop collar being disposed on the OTB, and
      on the condition that a flight-based mode of operation is initiated, separately transporting hydraulic fluid through the coarse rotatable pipe and through the second fluid passage while restricting transportation of hydraulic fluid from the first fluid passage;
   translating the OTB, the coarse rotatable pipe, projection, and the piston in concert parallel to the central axis while transferring hydraulic fluid between the cylinder aft chamber and the coarse rotatable pipe; and
   converting translation movement at the piston into a pivotal movement of the crankshaft about the radial blade axis via the translation of the projection.

\* \* \* \* \*